United States Patent [19]
Castner

[11] Patent Number: 5,811,499
[45] Date of Patent: Sep. 22, 1998

[54] SYNTHESIS OF CIS-1,4-POLYBUTADIENE RUBBER IN PRESENCE OF COBALT CONTAINING CATALYST SYSTEM

[75] Inventor: Kenneth Floyd Castner, Uniontown, Ohio

[73] Assignee: The Goodyear Tire & Rubber Company, Akron, Ohio

[21] Appl. No.: 944,399

[22] Filed: Oct. 6, 1997

Related U.S. Application Data

[62] Division of Ser. No. 692,359, Aug. 5, 1996, Pat. No. 5,733,835.

[51] Int. Cl.[6] .............................. C08F 4/70; C08F 136/06
[52] U.S. Cl. ...................... 526/143; 526/142; 526/169.1; 526/340.4; 526/903
[58] Field of Search .................................. 526/142, 143, 526/169.1, 340.4

[56] References Cited

U.S. PATENT DOCUMENTS

| | | | |
|---|---|---|---|
| 3,843,618 | 10/1974 | Yagi et al. | 526/143 X |
| 3,856,764 | 12/1974 | Throckmorton et al. | 260/82.1 |
| 3,910,869 | 10/1975 | Throckmorton | 526/340.4 X |
| 3,962,375 | 6/1976 | Throckmorton et al. | 526/335 |
| 4,383,097 | 5/1983 | Castner et al. | 526/133 |
| 5,100,982 | 3/1992 | Castner | 526/143 |
| 5,405,815 | 4/1995 | Bell et al. | 502/102 |

OTHER PUBLICATIONS

F A Cotton and G Wilkinson, "Advanced Inorganic Chemistry," 4th ed., Wiley–Interscience, pp. 766–767.

N N Greenwood and A Earnshaw, "Chemistry of the Elements," Pergamon Press, pp. 1294–1295, 1322–1327.

*Primary Examiner*—Fred Teskin
*Attorney, Agent, or Firm*—Alvin T. Rockhill

[57] ABSTRACT

It has been determined that 1,3-butadiene monomer can be polymerized into cis-l,4-polybutadiene rubber utilizing a cobalt-based catalyst system which is comprised of (a) an organocobalt compound, (b) a trialkylaluminum compound and (c) hexafluoro-2-propanol. The use of this catalyst system results in extremely fast rates of polymerization. The molecular weight of the cis-1,4- polybutadiene rubber made utilizing this cobalt-based catalyst system can be regulated by conducting the polymerization in the presence of 1,5-cyclooctadiene. This present invention more specifically discloses a catalyst system which is particularly useful for polymerizing 1,3-butadiene monomer into cis-1,4-polybutadiene, said catalyst system being comprised of (a) an organocobalt compound, (b) a trialkylaluminum compound and (c) hexafluoro-2-propanol. The subject invention further discloses a process for synthesizing cis-1,4-polybutadiene rubber which comprises polymerizing 1,3-butadiene in the presence of (a) an organocobalt compound, (b) a trialkylaluminum compound and (c) hexafluoro-2-propanol.

17 Claims, No Drawings

SYNTHESIS OF CIS-1,4-POLYBUTADIENE RUBBER IN PRESENCE OF COBALT CONTAINING CATALYST SYSTEM

This is a Divisional of Application Ser. No. 08/692,359, filed on Aug. 5, 1996, U.S. Pat. No. 5,733,835.

BACKGROUND OF THE INVENTION

High cis-1,4-polybutadiene rubber typically has a cis-isomer content of greater than about 95 percent and is widely used in manufacturing tires. It is widely used in tire tread rubber compounds because it provides improved treadwear characteristics for automobile and truck tires. In most cases, the cis-1,4-polybutadiene rubber is blended with one or more other rubbers to attain the desired tire tread characteristics.

It is well known that high cis-1,4-polybutadiene can be prepared by polymerizing 1,3-butadiene monomer with nickel-based catalyst systems. Such nickel-based catalyst systems contain (a) an organonickel compound, (b) an organoaluminum compound and (c) a fluorine containing compound. Such nickel-based catalyst systems and their use in the synthesis of cis-1,4-polybutadiene is described in detail in U.S. Pat. No. 3,856,764, U.S. Pat. No. 3,910,869 and U.S. Pat. No. 3,962,375.

The cis-1,4-polybutadiene prepared utilizing such nickel-based catalyst systems typically has a high molecular weight. Due to this high molecular weight, the cis-1,4-polybutadiene is generally oil-extended. However, this precludes the cis-1,4-polybutadiene from being utilized in many applications. For instance, such oil-extended rubbers cannot be utilized in tire sidewalls which contain white sidewall compounds. In any case, there is a large demand for cis-1,4-polybutadiene having a reduced molecular weight which can be processed without being oil-extended.

Various compounds have been found to act as molecular weight-reducing agents when used in conjunction with the nickel-based catalyst system. For instance, U.S. Pat. No. 4,383,097 discloses that ethylene and alpha-olefins, such as propylene and butylene, act as molecular weight-reducing agents when utilized in conjunction with such three-component nickel catalyst systems. Canadian Patent 1,236,648 indicates that 1-butene, isobutylene, cis-2-butene, trans-2-butene and allene act as molecular weight regulators when used in conjunction with such nickel-based catalyst systems. U.S. Pat. No. 4,383,097 reveals that certain nonconjugated diolefins, such as 1,4-pentadiene, 1,6-heptadiene and 1,5-hexadiene, act as molecular weight-reducing agents when utilized in conjunction with such catalyst systems. U.S. Pat. No. 5,100,982 indicates that cis-1,4-polybutadiene having reduced molecular weight and a broad molecular weight distribution can be synthesized with certain nickel-based catalyst systems in the presence of halogenated phenols, such as para-chlorophenol.

The use of nickel-based catalyst systems results in commercially viable polymerization rates. However, the development of catalyst systems which result in faster polymerization rates would be highly desirable. This is, of course, because faster rates of polymerization generally result in lower production costs. However, it is also critical for there to be a means for controlling the molecular weight of the cis-1,4-polybutadiene rubber made with such a catalyst system.

High cis-1,4-polybutadiene can also be prepared using cobalt-based catalyst systems. Typical cobalt catalysis uses a cobalt salt of an organic acid in conjunction with alkylaluminum chlorides as cocatalysts, and in cases where the chlorine/aluminum ratio is less than or equal to 1, water is used as an activator. The cobalt catalyzed polymerizations frequently use aromatic solvents, such as benzene and toluene, or mixtures of aromatic and aliphatic solvents. Polymer molecular weight is affected by solvent, catalyst component concentration, monomer conversion, and reaction temperature. Molecular weight can also be controlled by the use of transfer agents, such as allene, ethylene, propylene, and hydrogen.

SUMMARY OF THE INVENTION

It has been unexpectedly determined that 1,3-butadiene monomer can be polymerized into cis-1,4-polybutadiene rubber at a very fast polymerization rate utilizing a cobalt-based catalyst system which is comprised of (a) an organocobalt compound, (b) a trialkylaluminum compound and (c) hexafluoro-2-propanol. In fact, virtually quantitative yields can be achieved after polymerization times of only about one or two minutes. It has further been unexpectedly found that 1,5-cyclooctadiene acts as molecular weight-reducing agent when employed in conjunction with the cobalt-based catalyst systems of this invention.

The subject invention more specifically discloses a catalyst system which is particularly useful for polymerizing 1,3-butadiene monomer into cis-1,4-polybutadiene, said catalyst system being comprised of (a) an organocobalt compound, (b) a trialkylaluminum compound and (c) hexafluoro-2-propanol.

The subject invention further discloses a process for synthesizing cis-1,4-polybutadiene rubber which comprises polymerizing 1,3-butadiene in the presence of (a) an organocobalt compound, (b) a trialkylaluminum compound and (c) hexafluoro-2-propanol.

DETAILED DESCRIPTION OF THE INVENTION

The cobalt catalyst system of this invention can potentially be used to promote solution polymerizations, bulk polymerizations or vapor phase polymerizations. However, the polymerizations of this invention will typically be carried out as solution polymerizations in a hydrocarbon solvent which can be one or more aromatic, paraffinic or cycloparaffinic compounds. These solvents will normally contain from 4 to about 10 carbon atoms per molecule and will be liquids under the conditions of the polymerization. Some representative examples of suitable organic solvents include isooctane, cyclohexane, normal hexane, benzene, toluene, xylene, ethylbenzene and the like, alone or in admixture.

In the solution polymerizations of this invention, there will normally be from about 5 to about 35 weight percent monomers in the polymerization medium. Such polymerization media are, of course, comprised of the organic solvent and the 1,3-butadiene monomer. As the polymerization proceeds, monomer is converted to polymer and, accordingly, the polymerization medium will contain from about 5 to about 35 weight percent unreacted monomers and polymer. In most cases, it will be preferred for the polymerization medium to contain from about 10 to about 30 weight percent monomers and polymers. It is generally more preferred for the polymerization medium to contain from 20 to 25 weight percent monomers and polymers.

Polymerization is typically started by adding the cobalt-based catalyst system to the polymerization medium. In cases where it is desirable to moderate the molecular weight of the polymer being produced, 1,5-cyclooctadiene will additionally be added as a molecular weight regulator. The catalyst components (the organocobalt compound, the trialkylaluminum compound and the hexafluoro-2-propanol) will typically be added to the polymerization medium as separate components. The catalyst components can be added to the polymerization medium simultaneously or sequentially because the order of addition of catalyst components is not critical. However, it is typically preferred to sequentially add the trialkylaluminum compound followed by the addition of the organocobalt compound, with the hexafluoro-2-propanol being added last. In batch techniques, it is normally convenient to add the catalyst components and optionally the 1,5-cyclooctadiene to a polymerization medium which already contains 1,3-butadiene monomer in an organic solvent. In order to facilitate charging the catalyst components into the reaction zone "in situ," they can be dissolved in a small amount of an inert organic solvent or butadiene monomer.

The organocobalt compounds utilized in the catalyst systems of this invention are typically cobalt salts of organic acids which contain from 1 to about 20 carbon atoms. Some representative examples of suitable organocobalt compounds include cobaltous benzoate, cobalt acetate, cobalt naphthenate, cobalt octanoate, cobalt stearate, and cobaltic acetylacetonate. Cobalt naphthenate and cobalt octoate are highly preferred organocobalt compounds. Cobalt 2-ethylhexanoate, which is commonly referred to as cobalt octanoate (CoOct), is the organocobalt compound which is most commonly used due to economic factors.

The trialkylaluminum compounds that can be utilized have the structural formula:

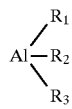

in which $R_1$, $R_2$ and $R_3$ represent alkyl groups (including cycloalkyl groups) which contain from 1 to about 20 carbon atoms. It is preferred for $R_1$, $R_2$ and $R_3$ to represent alkyl groups which contain from 1 to about 10 carbon atoms. It is more preferred for $R_1$, $R_2$ and $R_3$ to represent alkyl groups which contain from 2 to about 5 carbon atoms.

Some representative examples of trialkylaluminum compounds that can be utilized include trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum and trioctyl aluminum. The preferred trialkylaluminum compounds include triethyl aluminum (TEAL), tri-n-propyl aluminum, triisobutyl aluminum (TIBAL) and trihexyl aluminum.

The hexafluoro-2-propanol which is used in the catalyst systems of this invention is 1,1,1,3,3,3-hexafluoro-2-propanol which is of the formula: $(CF_3)_2CHOH$. Hexafluoro-2-propanol is also known as hexafluoroisopropyl alcohol.

The three-component cobalt catalyst systems utilized in the practice of the present invention have activity over a wide range of catalyst concentrations and catalyst component ratios. The three catalyst components interact to form the active catalyst system. As a result, the optimum concentration for any one component is very dependent upon the concentrations of each of the other two catalyst components. Furthermore, while polymerization will occur over a wide range of catalyst concentrations and ratios, the most desirable properties for the polymer being synthesized are obtained over a relatively narrow range.

Polymerizations will typically be carried out utilizing a mole ratio of the trialkylaluminum compound to the organocobalt compound which is within the range of about 5:1 to about 50:1. It is preferred for the molar ratio of the trialkylaluminum compound to the organocobalt compound to be within the range of about 10:1 to about 30:1. It is more preferred for the molar ratio of the trialkylaluminum compound to the organocobalt compound to be within the range of about 15:1 to about 25:1.

The molar ratio of the hexafluoro-2-propanol to the trialkylaluminum compound will typically be within the range of about 1:1 to about 3:1. It is normally preferred for the molar ratio of the hexafluoro-2-propanol to the trialkylaluminum compound to be within the range of about 1.2:1 to about 2:1. It is generally more preferred for the molar ratio of the hexafluoro-2-propanol to the trialkylaluminum compound to be within the range of about 1.3:1 to about 1.7:1.

The concentration of the catalyst system utilized in the reaction zone depends upon factors such as purity, the reaction rate desired, the polymerization temperature utilized, the reactor design and other factors. However, the catalyst system will normally be present in an amount whereby from about 0.0025 phm (parts by weight per 100 parts by weight of monomer) to about 0.018 phm of the organocobalt compound is present. In most cases, it is preferred for about 0.0035 phm to about 0.0095 phm of the organocobalt compound to be present. It is normally most preferred for about 0.0065 phm to about 0.0075 phm of the organocobalt compound to be present.

The amount of 1,5-cyclooctadiene that needs to be employed as a molecular weight-reducing agent varies with the catalyst system, with the polymerization temperature and with the desired molecular weight of the high cis-1,4-polybutadiene rubber being synthesized. For instance, if a high molecular weight rubber is desired, then a relatively small amount of 1,5-cyclooctadiene is required. On the other hand, in order to reduce molecular weights substantially, a relatively larger amount of 1,5-cyclooctadiene will need to be employed. However, as a general rule, from about 0.1 phm (parts by weight per hundred parts of monomer) to about 1.5 phm of the 1,5-cyclooctadiene will be employed as a molecular weight-reducing agent. It is normally preferred for about 0.35 phm to about 0.85 phm of the 1,5-cyclooctadiene to be present during the polymerization. In typical cases where high cis-1,4-polybutadiene rubber having a Mooney ML1+4 viscosity of about 55 to about 80 is being synthesized, the amount of 1,5-cyclooctadiene utilized will normally be within the range of about 0.5 phm to about 0.7 phm.

The temperatures utilized in the polymerizations of this invention are not critical and may vary from extremely low temperatures to very high temperatures. For instance, such polymerizations can be conducted at any temperature within the range of about −10° C. to about 130° C. The polymerizations of this invention will preferably be conducted at a temperature within the range of about 20° C. to about 100° C. It is normally preferred for the polymerization to be carried out at a temperaturew which is within the range of about 65° C. to about 85° C.

Such polymerizations will normally be conducted for a period of time which is sufficient to attain a high yield which is normally in excess of about 70 percent and preferably in excess of about 80 percent. The polymerization time required to attain such high conversions is extremely short. In fact, conversions in excess of 80 percent can be realized in less than 4 minutes. In most cases, conversions in excess of 80 percent can be attained in less than 2 minutes of polymerization time. Polymerization times of one minute or less are normally sufficient to attain conversions in excess of 80 percent.

The cis-1,4-polybutadiene rubber made utilizing the techniques of this invention typically has a cis content in excess of about 97 percent. For example, the cis-1,4-polybutadiene rubber made utilizing the techniques of this invention will typically have a cis content of about 98 percent, a trans content of about 1 percent and a vinyl content of about 1 percent.

After the polymerization is completed, the cis-1,4-polymerization rubber may be recovered from the resulting polymer solution (rubber cement) by any of several procedures. One such procedure comprises mixing the rubber cement with a polar coagulating agent, such as methanol, ethanol, isopropanol, acetone or the like. The coagulated rubber is recovered from the slurry of the polar coagulating agent by centrifugation, decantation or filtration.

Another procedure for recovering the cis-1,4-polybutadiene rubber is by subjecting the rubber solution to spray drying. Such a procedure is particularly suitable for continuous operations and has the advantage that heat requirements are at a minimum. When such a procedure is used, the recovered polymer should be washed soon after recovery with a polar solvent in order to destroy the remaining active catalyst contained in the polymer. In such procedures, the vaporized organic solvents are also easily recovered but will normally require purification before being recycled.

The practice of this invention is further illustrated by the following examples which are intended to be representative rather than restrictive of the scope of the subject invention. Unless indicated otherwise, all parts and percentages are given by weight. Dilute solutions viscosities were determined in toluene at 30° C.

EXAMPLES 1–8

In this series of experiments, high cis-1,4-polybutadiene was synthesized using the catalyst system of this invention. In the procedure used, a series of 4-ounce (118 ml) polymerization bottles were filled with 100 ml of 16 weight percent solutions of 1,3-butadiene in hexane solvent. The 1,3-butadiene/hexane premix solutions had been passed through a silica gel-packed column under a nitrogen atmosphere. The hexane solvent was a mixture of various hexane isomers.

Polymerization was initiated by injecting solutions of the three catalyst components and 1,5-cyclooctadiene into each of the polymerization bottles under a nitrogen atmosphere. The polymerization bottles were capped with a punctured metal cap fitted with a self-sealing gasket and Teflon liner. All catalyst and modifier solutions were made in hexane solvent which had been passed through a silica gel column. All of the catalyst component and modifier additions were made with a syringe which was equipped with a hypodermic needle.

A solution of triisobutylaluminum was added first, followed by the addition of cobalt octanoate, with a solution of hexafluoro-2-propanol being added last. The molar ratio of triisobutylaluminum (TIBA) to cobalt octanoate (CoOct) was 20:1 with 0.0172 phm of the cobalt octanoate and 1 phm of 1,5-cyclooctadiene being added. The molar ratio of hexafluoro-2-propanol (HFI) to triisobutylaluminum is shown in Table I. However, it should be noted that Example 8 was run as a control with no HFI being added.

The polymerizations were carried out by rotating the polymerization bottles end-over-end for 90 minutes in a constant temperature water bath which was maintained at 65° C. After the 90-minute reaction time, the polymerization was shortstopped by the addition of 1.0 phm of isopropanol, 1.0 phm of rosin acid and 1.0 phm of butylated hydroxytoluene. The high cis-1,4-polybutadiene synthesized was isolated by vacuum oven drying. Polymer yield, dilute solution viscosity (DSV) and Brookfield viscosity (BFV) are reported in Table I. DSV was measured as a 0.25 g/dl solution in toluene at 30° C. and BFV was measured on 10 weight percent solutions in toluene at room temperature.

TABLE I

| Example | HFI/TIBA | DSV | BFV | Yield |
|---------|----------|-----------|-----------|-------|
| 1 | 1.00 | 1.57 dl/g | 700 cps | 68% |
| 2 | 1.25 | 1.62 dl/g | 710 cps | 98% |
| 3 | 1.50 | 1.61 dl/g | 750 cps | 100% |
| 4 | 2.00 | 1.71 dl/g | 1,050 cps | 91% |
| 5 | 2.14 | 1.76 dl/g | 1,120 cps | 93% |
| 6 | 2.25 | 1.90 dl/g | 1,750 cps | 87% |
| 7 | 2.50 | 2.00 dl/g | 2,350 cps | 89% |
| 8 | — | — | — | 0% |

Inspection of the results in Table I shows that high catalyst activity is attained at HFI/TIBA ratios of greater than 1:1 and that the polymer viscosity (both DSV and Brookfield viscosity) increase with increasing HFI/TIBA ratios. NMR (nuclear magnetic resonance) analysis of the polymer synthesized showed it to be 98 percent cis-1,4, 1 percent trans-1,4 and 1 percent vinyl polybutadiene. The polymer was also determined to have a glass transition temperature ($T_g$) of –106° C. and a melting point ($T_m$) of –8 C., both of which are typical of high cis-1,4-polybutadiene.

EXAMPLES 9–15

In this series of experiments, high cis-1,4-polybutadiene was synthesized using the catalyst system of this invention in the presence of varying amounts of 1,5-cyclopentadiene (COD). In the procedure used, a series of 32-ounce (946 ml) polymerization bottles were filled with 500 ml of 16 weight percent solutions of 1,3-butadiene in hexane solvent. The 1,3-butadiene/hexane premix solutions had been passed through a silica gel-packed column under a nitrogen atmosphere. The hexane solvent was a mixture of various hexane isomers.

The desired amount of COD was added to each of the polymerization bottles first. Then, polymerization was initiated by injecting solutions of the three catalyst components into each of the polymerization bottles. A solution of triisbutylaluminum was added first followed by the addition of cobalt octanoate with a solution of hexafluoro-2-propanol being added last. The molar ratio of cobalt octanoate to triisobutylaluminum to HFI was approximately 1:20:30 with 0.0172 phm of the cobalt octanoate and 0.19 phm of triisobutylaluminum being added. The amount of 1,5-cyclooctadiene utilized is shown in Table II.

The polymerizations were carried out by leaving the polymerization bottles in a constant temperature bath which was maintained at 65° C. for 90 minutes. The Mooney ML1+4 viscosity (at 100° C.), dilute solution viscosity (DSV) and cold flow of the high cis-1,4-polybutadiene rubber samples made are reported in Table II.

TABLE II

| Example | COD | ML1 + 4 | DSV | Cold Flow |
| --- | --- | --- | --- | --- |
| 9 | 0.35 phm | 127 | 2.80 dl/g | — |
| 10 | 0.53 phm | 80 | 2.45 dl/g | — |
| 11 | 0.71 phm | 55 | 2.10 dl/g | 0.50 mg/min |
| 12 | 0.81 phm | 47 | 1.91 dl/g | 0.84 mg/min |
| 13 | 0.86 phm | 40 | 1.91 dl/g | 1.14 mg/min |
| 14 | 0.88 phm | 38 | 1.98 dl/g | 1.82 mg/min |
| 15 | 1.06 phm | 24 | 1.66 dl/g | 5.66 mg/min |

As can be seen from Table II, COD acts as a molecular weight regulator. The Mooney viscosity and DSV of the high cis-1,4-polybutadiene rubber synthesized decreases with increasing amounts of COD. Thus, molecular weight decreases with increasing amounts of COD. On the other hand, the cold flow of the high cis-1,4-polybutadiene rubber increases with increasing levels of COD.

EXAMPLES 16–22

In this series of experiments, the effect of catalyst level on yield and DSV was studied. The polymerization procedure used was essentially the same as the procedure utilized in Examples 1–8 with catalyst levels being varied.

Polymerization was initiated by injecting solutions of the three catalyst components and 1,5-cyclooctadiene into each of the polymerization bottles. A solution of triisobutylaluminum was added first, followed by the addition of cobalt octanoate with a solution of hexafluoro-2-propanol being added last. The molar ratio of cobalt octanoate to triisobutylaluminum to HFI was 1:20:30. In each of the polymerizations conducted in this series of experiments, 0.88 phm of 1,5-cyclooctadiene was added. The amount of cobalt octanoate, triisobutylaluminum and HFI utilized is shown in Table III. The polymer yield and DSV attained are also shown in Table III.

TABLE III

| Example | TIBA[1] | CoOct[2] | HFI[3] | Yield | DSV[4] |
| --- | --- | --- | --- | --- | --- |
| 16 | 0.138 | 0.0121 | 0.176 | 96% | 1.92 |
| 17 | 0.118 | 0.0104 | 0.151 | 96% | 1.91 |
| 18 | 0.098 | 0.0086 | 0.126 | 96% | 2.08 |
| 19 | 0.081 | 0.0069 | 0.101 | 95% | 1.94 |
| 20 | 0.061 | 0.0052 | 0.077 | 92% | 2.15 |
| 21 | 0.040 | 0.0034 | 0.051 | 74% | 2.10 |
| 22 | 0.020 | 0.0017 | 0.025 | 0% | — |

[1]The level of TIBA is reported in phm.
[2]The level of CoOct is reported in phm.
[3]The level of HFI is reported in phm.
[4]DSV is reported in dl/g.

The results listed in Table III show that high polymerization activity is achieved at CoOct levels of 0.0052 phm or higher. Also, the data shows that the polymer DSV is relatively independent of catalyst level, when run in the presence of 1,5-cyclooctadiene.

EXAMPLES 23–26

In this series of experiments, the effect of 1,5-cycloqctadiene level on polymer molecular weight was studied. The polymerization procedure used was essentially the same as the procedure utilized in Examples 1–8 with COD levels being varied. However, in this series of experiments, the polymerizations were carried out in 8-ounce (237 ml) polymerization bottles with the molar ratio of TIBA to CoOct being 10.4:1 and with the molar ratio of HFI to TIBA being 1.95:1. The CoOct was utilized at a level of 0.086 phm.

The level of COD utilized is reported in Table IV. Table IV also shows the DSV, number average molecular weight ($M_n$), weight average molecular weight ($M_w$) and $M_w/M_n$ ratio of the cis-1,4-polybutadiene rubber samples made.

TABLE IV

| Example | COD | DSV[1] | $M_n$ | $M_w$ | $M_w/M_n$ |
| --- | --- | --- | --- | --- | --- |
| 23 | 0.0010 | 2.94 | $1.7 \times 10^5$ | $7.1 \times 10^5$ | 4.2 |
| 24 | 0.0032 | 2.52 | $1.4 \times 10^5$ | $5.2 \times 10^5$ | 3.8 |
| 25 | 0.0052 | 2.31 | $1.1 \times 10^5$ | $3.9 \times 10^5$ | 3.6 |
| 26 | 0.0074 | 2.01 | $1.0 \times 10^5$ | $3.4 \times 10^5$ | 3.4 |

[1]Reported in dl/g.

Table IV shows that COD can be used to change the molecular weight distribution ($M_w/M_n$) of the high cis-1,4-plolybutadiene as well as to regulate its molecular weight. More specifically, a more narrow molecular weight distribution can be attained by using higher levels of COD.

EXAMPLES 27–31

In this series of experiments, the effect of various potential modifiers on yield and DSV was studied. The polymerization procedure used was essentially the same as the procedure utilized in Examples 1–8 with the polymerizations being conducted in the presence of 0.0092M modifier, which included 1,5-hexadiene, 1,5-cyclooctadiene, dicyclopentadiene or butene-1. A control was also run (see Example 27). However, in this series of experiments, the polymerizations were carried out with the molar ratio of TIBA to CoOct being 17.7:1 and with the molar ratio of HFI to TIBA being 1.5:1. The CoOct was utilized at a level of 0.029 phm.

The potential modifiers utilized in each experiment are identified in Table V. Table V also shows the yield and DSV of the cis-1,4-polybutadiene rubber samples made.

TABLE V

| Example | Modifier | Yield | DSV |
| --- | --- | --- | --- |
| 27 | none | 100% | 5.71 dl/g |
| 28 | 1,5-hexadiene | 100% | 5.70 dl/g |
| 29 | 1,5-cyclooctadiene | 98% | 2.27 dl/g |
| 30 | dicyclopentadiene | 40% | 4.79 dl/g |
| 31 | butene-1 | 100% | 5.62 dl/g |

As can be seen from Table V, of the organic compounds evaluated, only 1,5-cyclooctadiene acts as a molecular weight regulator when used in conjunction with the catalyst systems of this invention. The results with dicyclopentadiene indicate that it is a poison for the polymerization and that lower DSV is achieved only as a result of lower yield.

EXAMPLES 32–59

Even though the polymerizations described in Examples 1–31 were carried out for 90 minutes, the Cooct/TIBA/HFI catalyzed polymerization of 1,3-butadiene is sufficiently fast that the bulk of the polymerization is over within 2 minutes. The polymerization procedure used was essentially the same as the procedure utilized in Examples 1–8 with the molar ratio of TIBA to CoOct being 17.7:1 and with the molar ratio of HFI to TIBA being 1.5:1. The COD was utilized at a level of 0.85 phm in Examples 32–55 and at a level of 0.75 phm in Examples 56–59. The amount of CoOct utilized is reported in Table VI. The polymerization time (Pzn. Time) and polymer yield are also reported in Table VI.

TABLE VI

| Example | CoOct | Pzn. Time | Yield |
|---|---|---|---|
| 32 | 0.0012 phm | 60 seconds | 16% |
| 33 | 0.0012 phm | 120 seconds | 18% |
| 34 | 0.0012 phm | 240 seconds | 20% |
| 35 | 0.0024 phm | 60 seconds | 15% |
| 36 | 0.0024 phm | 120 seconds | 37% |
| 37 | 0.0024 phm | 240 seconds | 42% |
| 38 | 0.0036 phm | 60 seconds | 41% |
| 39 | 0.0036 phm | 120 seconds | 46% |
| 40 | 0.0036 phm | 240 seconds | 54% |
| 41 | 0.0048 phm | 60 seconds | 41% |
| 42 | 0.0048 phm | 120 seconds | 53% |
| 43 | 0.0048 phm | 250 seconds | 68% |
| 44 | 0.0060 phm | 60 seconds | 49% |
| 45 | 0.0060 phm | 120 seconds | 63% |
| 46 | 0.0060 phm | 240 seconds | 68% |
| 47 | 0.0140 phm | 5 seconds | 29% |
| 48 | 0.0140 phm | 10 seconds | 69% |
| 49 | 0.0140 phm | 15 seconds | 82% |
| 50 | 0.0140 phm | 20 seconds | 85% |
| 51 | 0.0240 phm | 15 seconds | 83% |
| 52 | 0.0240 phm | 30 seconds | 84% |
| 53 | 0.0240 phm | 60 seconds | 86% |
| 54 | 0.0240 phm | 150 seconds | 89% |
| 55 | 0.0240 phm | 300 seconds | 90% |
| 56 | 0.0039 phm | 60 seconds | 23% |
| 57 | 0.0074 phm | 60 seconds | 70% |
| 58 | 0.0074 phm | 120 seconds | 89% |
| 59 | 0.0150 phm | 60 seconds | 96% |

Table VI shows that the CoOct/TIBA/HFI catalyst system is extremely active for the polymerization of 1,3-butadiene monomer into high cis-1,4-polybutadiene rubber. More specifically, Table VI shows that conversions of greater than 80 percent can be reached in less than 3 minutes. In fact, Examples 51–53 and 59 show that conversions of greater than 80 percent can be reached in one minute or less. Example 59 shows that a conversion of greater than 95 percent can be reached in only one minute.

While certain representative embodiments and details have been shown for the purpose of illustrating the subject invention, it will be apparent to those skilled in this art that various changes and modifications can be made without departing from the scope of the present invention.

What is claimed is:

1. A process for synthesizing cis-1,4-polybutadiene rubber hich comprises polymerizing 1,3-butadiene in the presence of (a) at least one cobalt compound selected from the group consisting of organocobalt compounds and cobalt complexes of an organic acid, (b) a trialkylaluminum compound and (c) hexafluoro-2-propanol.

2. A process as specified in claim 1 wherein said polymerization is conducted at a temperature which is within the range of −10° C. to 130° C.

3. A process as specified in claim 2 wherein the organocobalt compound or the cobalt complex of the organic acid is present in an amount which is within the range of 0.0025 phm to 0.018 phm.

4. A process as specified in claim 3 wherein the cobalt compound is a cobalt salt of an organic acid.

5. A process as specified in claim 4 wherein the trialkylaluminum compound is of the structural formula:

wherein $R_1$, $R_2$ and $R_3$ represent alkyl groups containing from 1 to 20 carbon atoms.

6. A process as specified in claim 5 wherein the molar ratio of the trialkylaluminum compound to the cobalt salt of an organic acid is within the range of 5:1 to 50:1.

7. A process as specified in claim 6 wherein the molar ratio of the hexafluoro-2-propanol to the trialkylaluminum compound is within the range of 1:1 to 3:1.

8. A process as specified in claim 7 wherein the molar ratio of the trialkylaluminum compound to the cobalt salt organic acid is within the range of 10:1 to 30:1.

9. A process as specified in claim 8 wherein the molar ratio of the hexafluoro-2-propanol to the trialkylaluminum compound is within the range of 1.2:1 to 2:1.

10. A process as specified in claim 9 wherein $R_1$, $R_2$ and $R_3$ represent alkyl groups which contain from 1 to about 10 carbon atoms.

11. A process as specified in claim 10 wherein the cobalt salt of an organic acid contains from 1 to 20 carbon atoms.

12. A process as specified in claim 1 wherein the cobalt compound is selected from the group consisting of cobalt benzoate, cobalt acetate, cobalt naphthenate, cobalt octoate, cobalt stearate and cobalt acetylacetonate.

13. A process as specified in claim 1 wherein the cobalt compound is selected from the group consisting of cobalt naphthenate, cobalt octoate and cobalt neodecanoate.

14. A catalyst system as specified in claim 12 wherein the molar ratio of the trialylaluminum compound to the cobalt compound which is within the range of 15: 1 to 25:1.

15. A process as specified in claim 14 wherein the molar ratio of the hexafluoro-2-propanol to the trialkylaluminum compound is within the range of 1.3:1 to 1.7:1.

16. A process as specified in claim 5 wherein $R_1$, $R_2$ and $R_3$ represent alkyl groups which contain from 2 to 5 carbon atoms.

17. A process as specified in claim 15 wherein the cobalt compound is cobalt octanoate; and wherein the trialkylaluminum compound is triisobutylaluminum.

* * * * *